Dec. 10, 1935.    C. K. SCHWARTZ    2,024,115
VARIABLE GEARING
Original Filed July 7, 1933    6 Sheets-Sheet 1

INVENTOR
CARL K. SCHWARTZ,
BY
ATTORNEY

Dec. 10, 1935.  C. K. SCHWARTZ  2,024,115
VARIABLE GEARING
Original Filed July 7, 1933  6 Sheets-Sheet 2

INVENTOR
CARL K. SCHWARTZ,
BY
ATTORNEY

Dec. 10, 1935.  C. K. SCHWARTZ  2,024,115
VARIABLE GEARING
Original Filed July 7, 1933   6 Sheets-Sheet 3

INVENTOR
CARL K. SCHWARTZ,
BY
ATTORNEY

FIG. 5.

Dec. 10, 1935.   C. K. SCHWARTZ   2,024,115
VARIABLE GEARING
Original Filed July 7, 1933   6 Sheets-Sheet 5

INVENTOR
CARL K. SCHWARTZ,
BY
ATTORNEY

Patented Dec. 10, 1935

2,024,115

UNITED STATES PATENT OFFICE 2,024,115

VARIABLE GEARING

Carl K. Schwartz, Elkhart Lake, Wis., assignor to John Wood Manufacturing Company, Inc., Conshohocken, Pa., a corporation of Delaware Original application July 7, 1933, Serial No. 679,292. Divided and this application May 24, 1934, Serial No. 727,229

12 Claims. (Cl. 74—395)

This is a division of my original application Serial No. 679,292 filed July 7, 1933, for Letters Patent of the United States for improvement in liquid dispensing apparatus wherein the claims are drawn to dispensing and registering apparatus. The claims in this case are drawn to the variable gearing and auxiliary variable drive connection which are particularly applicable to cooperatively connect the meter of a liquid dispensing mechanism with means for computing and registering the value of the liquid dispensed in accordance with the price per unit of volume for which the mechanism may be variably manually set.

My invention is particularly applicable to metering pumps for dispensing gasolene. The principal object and effect thereof is to provide simple and efficient means for automatically computing and visibly displaying, by registering mechanism, the value of the liquid dispensed at each transaction, in acordance with the volume of liquid thus dispensed. Such computation may be based upon any predetermined price of the liquid per unit of volume, which price may be varied, in fractions of a cent, by manually adjusting the computing mechanism.

In the form of my invention illustrated, the unit of gasolene is a gallon, and its value computed in tenths of a cent. The value based upon the whole cents of the price, and the value based upon any fraction of a cent of the price, are respectively computed by a main mechanism and an auxiliary mechanism, but they are in such cooperative relation that the result of the auxiliary computation is automatically added to the result of the main computation and the aggregate value thereof automatically displayed by the registering mechanism.

My invention includes the various novel features of construction and arrangement hereinafter more definitely specified.

Figures 1, 6:
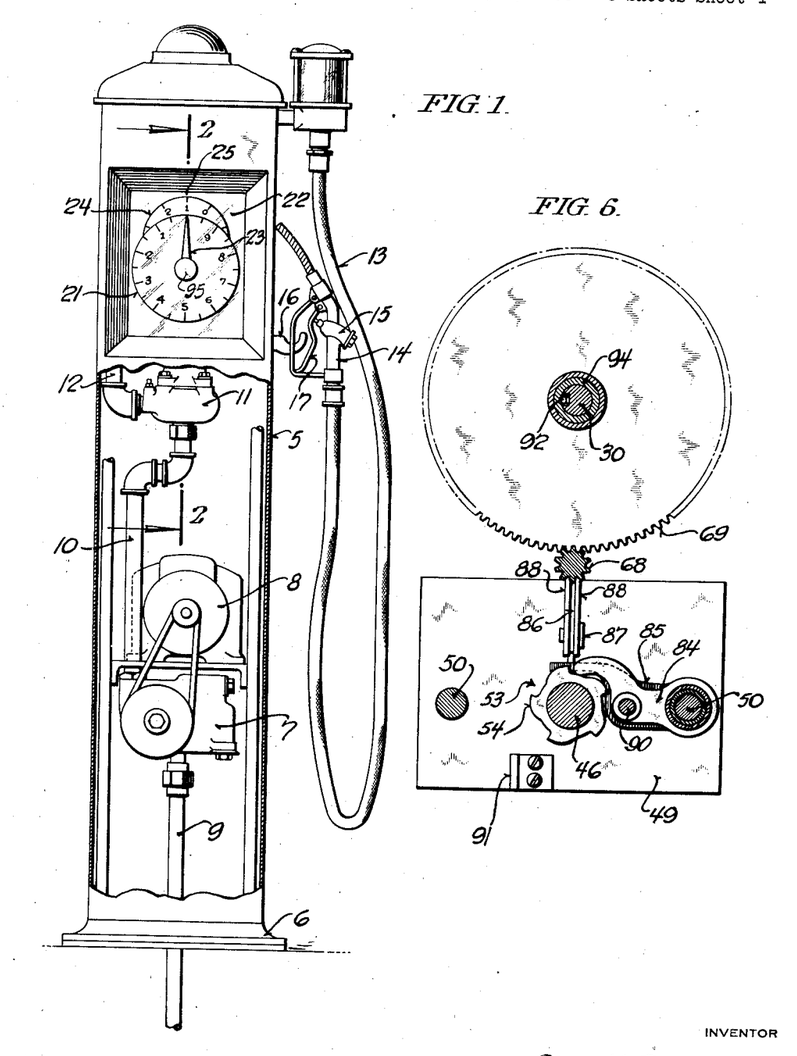
Fig. 1 is a view partly in elevation and partly in section of a gasolene dispensing apparatus of the curb stand type equipped with this invention.
Fig. 6 is a fragmentary vertical sectional view taken on the line 6—6 in Fig. 2.

Referring to Fig. 1: The casing 5 is mounted on a suitable base 6 and contains a pump 7 driven by an electric motor 8. The inlet of the pump is connected through a pipe 9 with a source of gasolene supply, usually an underground tank (not shown) and the outlet of the pump is connected through a pipe 10 with a meter 11. The outlet of the meter 11 is connected through a pipe 12, with a dispensing hose 13, the free end of which has a discharge nozzle 14 provided with a normally closed valve 15.

As is customary, the discharge nozzle, when not in use, is supported on a movable hook 16 projected from the side of the casing, the weight of the nozzle being sufficient to hold the hook down. Upon removal of the discharge nozzle from the hook 16, the hook rises to close a motor starting switch which starts the pumping action. However, no liquid is discharged from the nozzle until the valve 15 therein is opened, this being controlled by a handle 17.

As the liquid is dispensed from the nozzle, an impeller or other suitable rotatable means (not shown) forming part of the meter structure 11, imparts rotation to a power take-off shaft 18 through a gear connection indicated as at 19.

This power take-off shaft 18 is ordinarily utilized to drive an amount registering pointer or similar indicating means, but in the present instance, it is utilized to drive and actuate the cost computing mechanism indicated generally by the numeral 20.

Figure 10:
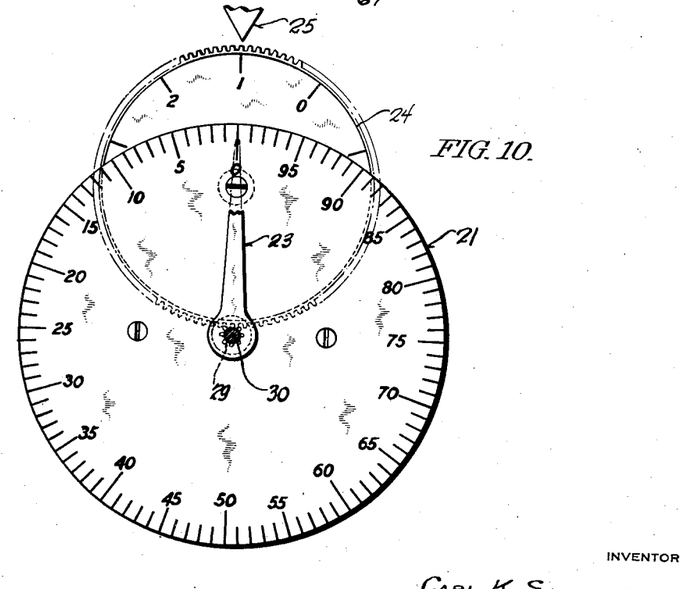
Fig. 10 is a vertical sectional view, taken on the line 10—10 in Fig. 2; showing an elevation of two of the dials of the registering mechanism indicated in Fig. 1.
Figure 11:
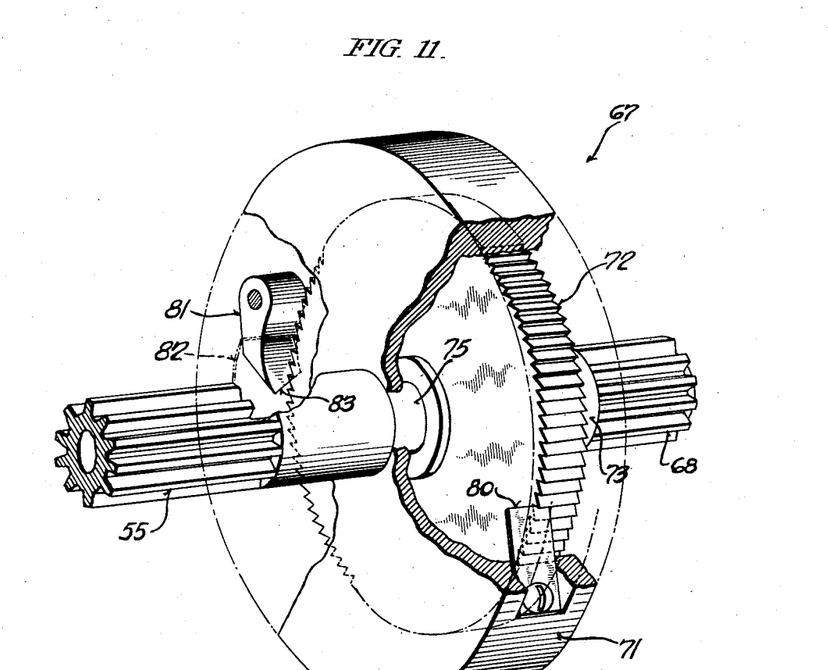
Fig. 11 is an enlarged fragmentary partly sectional perspective view of the driving connection between the main and auxiliary computing means.

The cost registering or indicating mechanism includes a pair of spaced dials 21 visible through glass panels 22 on two opposite sides of the dispensing apparatus; these dials are divided into one hundred equal spaces with graduations corresponding to one cent divisions, as best shown in Fig. 10, and cooperable with each is an indicator pointer 23 rotatable about the face of the dial.

Coacting with the dials 21 are smaller dollar indicating dials 24, the upper portions of which are visible above the dials 21. These dollar indicating dials are graduated and coact with a fixed pointer 25 to indicate whole dollars and in conjunction with the pointers 23 and the dials 21, designate the total cost of the liquid dispensed.

The dollar indicating dials 24 are fixed to a common sleeve 26 rotatably mounted on a sleeve 27 forming a tie between the stationary dials 21. A gear 28 fixed to the sleeve 26 and meshing with a pinion 29, which is mounted on a shaft 30 carrying the pointers 23, provides a driving connection from the shaft 30 to the dials 24, this gear and pinion connection being of such ratio that the dials 24 are moved the angular distance from one graduation to the next during the complete rotation of the pointers 23. In this manner, the conjoint use of the two dials enables the registration of the cost of any normal or usual amount of gasolene dispensed.

As stated, the two stationary dials 21 are rigidly connected by the sleeve 27. A pair of tie rods 31 at opposite sides of the central axis of the dials cooperate with the sleeve 27 to securely connect the dials in rigid spaced relation. These tie rods 31 extend along opposite sides of the driving mechanism indicated generally by the numeral 32 and are attached thereto to receive support as will be presently described.

The driving mechanism indicated generally by the numeral 32, is assembled on a frame consisting of two spaced parallel end plates 33 and 34 rigidly connected by two upper rods 35 and two lower rods 36. The lower rods 36 rest on a support 37 carried by the top of the meter 11 and are clamped down on said support by a cross piece 38.

Extending transversely across the two rods 31 connecting the dials and the upper rods 35 is a clamping structure 39 by which the rods 31 and the dials attached thereto are supported from the driving mechanism and, as the driving mechanism is in turn supported from the meter, the entire registering apparatus receives its support from the meter. This is a particularly advantageous manner of mounting the mechanism as it insures alignment with the power take-off shaft 18. Said shaft 18 is used to drive the shaft 30 carrying the pointers 23 and also to drive the dials 24, as follows:

A shaft 40 journaled in a bearing 41 fixed to the end plate 33 and having a bevel gear 42 at its upper end and the cross pin 43 at its lower end, is directly driven from the shaft 18 through the driving connection afforded by the engagement of the shaft cross pin 43 in a cross slot 44 in the end of the shaft 18. The shaft 40 and its bevel gear 42 thus are driven from the impeller of the meter in predetermined fixed ratio to the amount of liquid dispensed.

The bevel gear 42 meshes with a gear 45 fixed to a shaft 46 journalled at one end in a bearing 47 carried by the end wall 34 and at its opposite end in a bearing 48 carried by an outer supporting wall 49. The wall 49 is supported from the end wall 33 by a pair of studs 50. As clearly shown in Fig. 4, the end wall 33 is apertured as at 51 to accommodate the gear 45.

Mounted on the shaft 46 between the end walls 33 and 34 is a group of twenty-one driving gears 52, ranging in size from ten to thirty teeth, each being one tooth larger than the preceding gear.

Also secured to the shaft 46 between the gear 45 and the outer supporting wall 49 is a plurality of driving cams 53, there being ten cams having progressively increasing numbers of high spots substantially in the form of teeth 54 ranging from no teeth on the cam closest the gear 45 to nine teeth on the cam at the opposite end of the series. The purpose of these cams is to actuate an auxiliary driving connection which is supplemental to that afforded by the group of gears 52, as will be hereinafter more fully described.

Above the shaft 46 is a gear shaft 55 journaled in bearings 56 and 57 carried respectively by the end walls 33 and 34. This shaft has ten gear teeth cut into it which extend throughout its entire length, and has a sleeve 58 slidably and freely rotatably mounted thereon. The sleeve 58 has an arm 59 projecting therefrom, the outer end of which is slotted as at 60.

Figure 3:
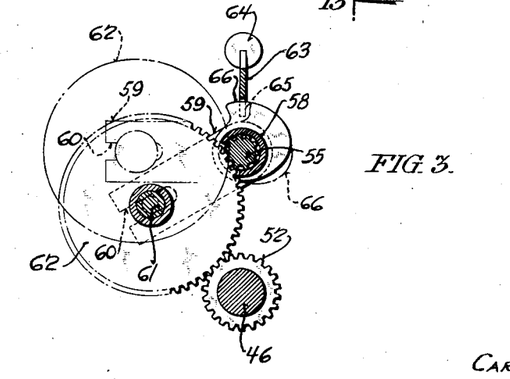
Fig. 3 is a fragmentary vertical sectional view taken on the line 3—3 in Fig. 2.

Adjustably secured in the slot 60 is a bearing stud 61 for a large idler gear 62, which is freely rotatable on its bearing stud 61, and is at all times in mesh with the teeth of the shaft 55, the adjustment afforded by the slot 60 enabling the gear to be properly meshed with the teeth of the shaft 55. As best shown in Fig. 3, the gear 62 extends through the side of the sleeve 58, for its engagement with the teeth of the shaft 55.

In this manner, the idler gear 62 is at all times in mesh with the shaft 55, regardless of its location with respect to the length of the shaft 55, so that the idler gear 62 may be engaged with any one of the group of driving gears 52 to establish a driving connection between the shafts 46 and 55. The ratio of the drive between the shafts 46 and 55 is of course determined by the selection of the gear in the group 52.

To hold the sleeve 58 carrying the idler gear in an adjusted position and to facilitate the selection of the proper gear 52, a scale 63 is provided. The scale 63 consists of a flat metal bar depending from a stud 64 and having a plurality of comb teeth 65 defining spaces with which a flat web 66 carried by the supporting sleeve 58 is engageable.

Figure 2:
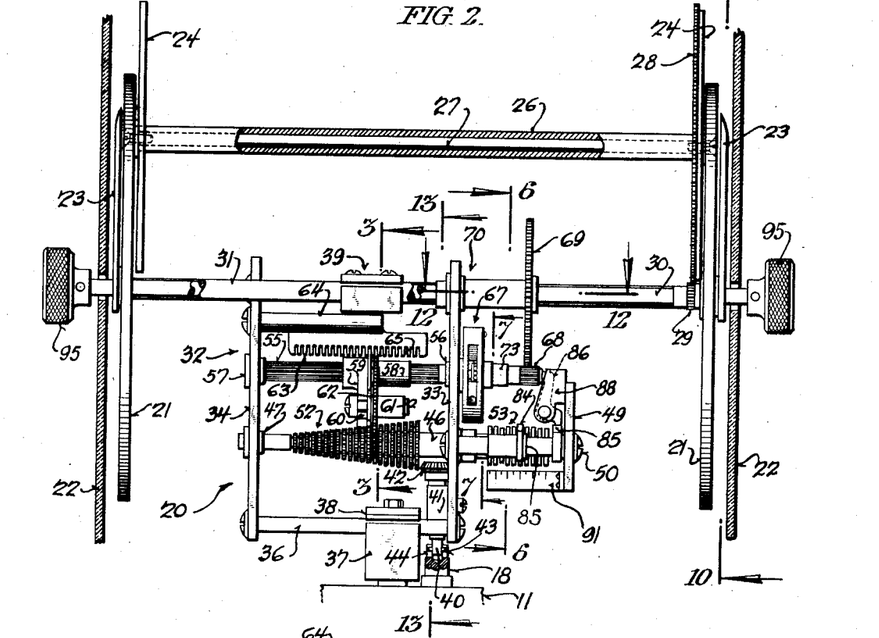
Fig. 2 is a vertical sectional view of the computing and registering mechanism taken substantially on the line 2—2 in Fig. 1.
Figure 4:
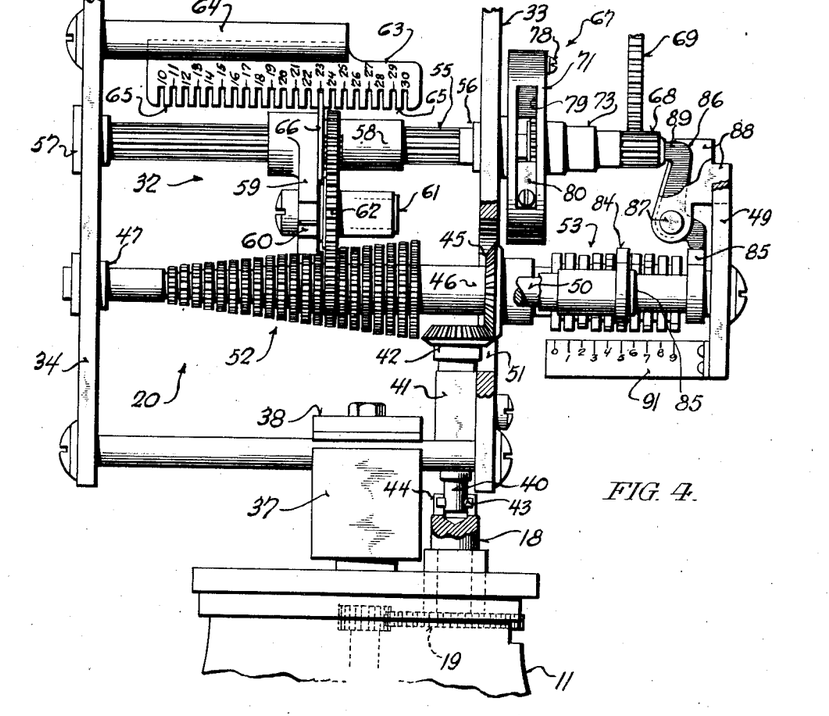
Fig. 4 is an enlarged view similar to Fig. 2, but illustrating only the driving connections of the computing mechanism.
Figure 5:
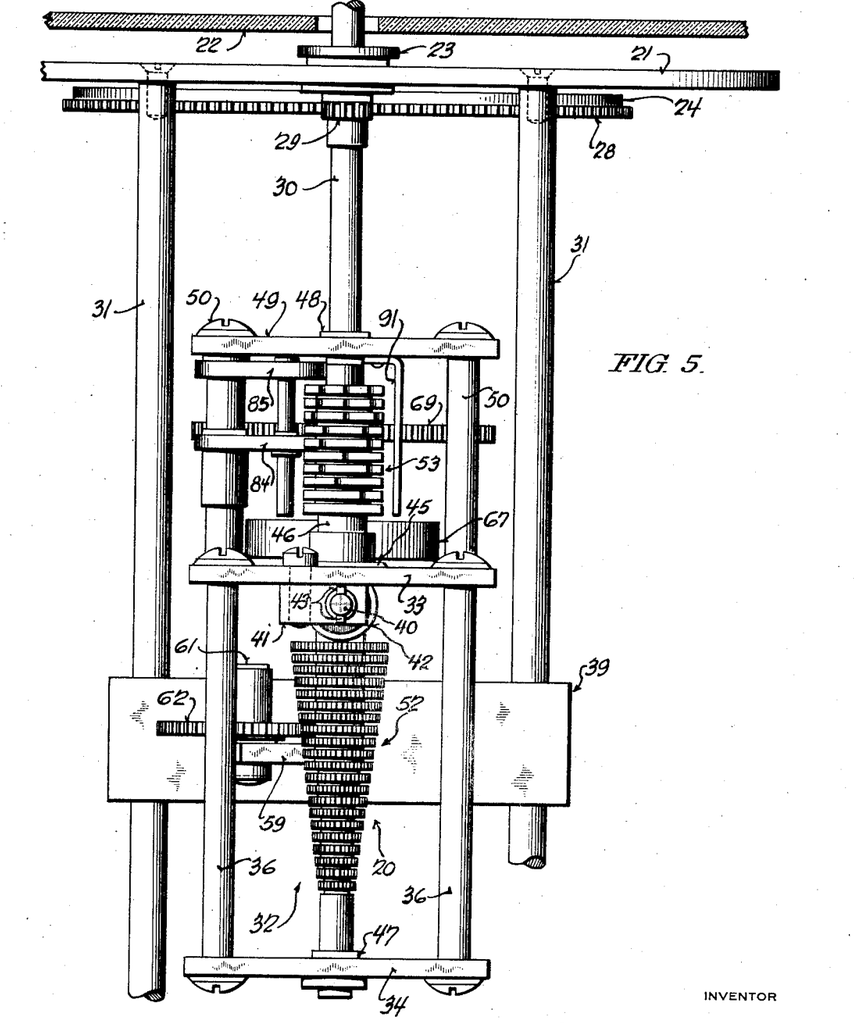
Fig. 5 is an enlarged inverted plan view of a portion of the mechanism shown in Fig. 2, illustrating particularly the driving means for the computing and registering mechanism.

The location of the spaces between the comb teeth 65, and the web 66 with respect to the idler gear 62 is such that by engaging the web 66 in the first space at the left hand end of the scale with respect to Figs. 2 and 4, the idler gear will be meshed with the smallest of the group of gears 52. The successive spaces correspond to the successive gears in the group 52 and as the gears in the group range from ten to thirty teeth inclusive and the shaft 55 also has ten teeth, the ratio obtained by the engagement of the idler with the first or smallest gear of the group 52, will be one to one, representing in the present instance, a unit cost per unit of measure of the liquid of ten cents. This amount is delineated on the scale 63 opposite the first space as clearly shown in Fig. 4.

Adjustment of the position of the idler 62 of course requires disengagement of the web 66 from the spaces between the comb teeth 65. The manner of effecting this disengagement is clearly illustrated in dotted lines in Fig. 3.

Said idler 62 and the elements cooperative therewith, as specified, constitute means for manually adjustably varying the ratio of the main driving connection between the driving member of the meter 11 which actuates the shaft 40 of the computing mechanism, and the registering indicating mechanism comprising the rotary pointers 23 and the rotary dials 24.

Figure 12:
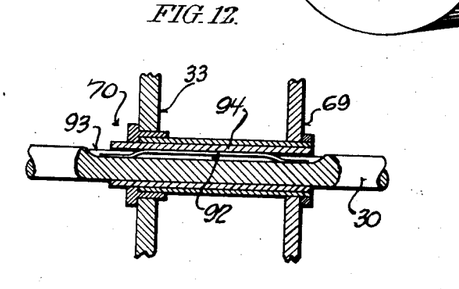
Fig. 12 is a fragmentary plan sectional view showing the frictional driving connection between the indicator shaft, of the registering mechanism, and the gear for driving it, taken on the line 12—12 in Fig. 2.
Figure 13:
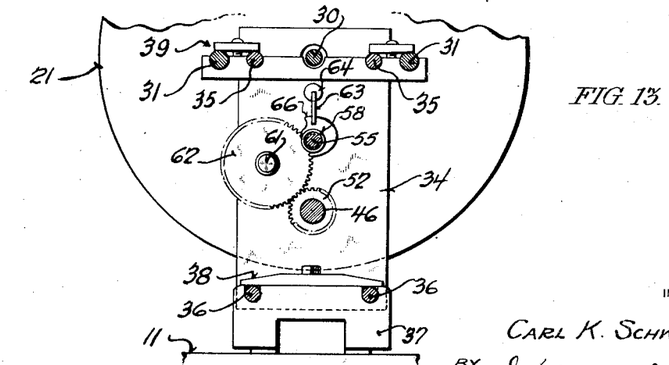
Fig. 13 is a vertical sectional view taken on the line 13—13 in Fig. 2.

Mounted on the end of the gear shaft 55 adjacent the wall 33 is a ratchet driving connection indicated generally by the numeral 67 through which rotation of the shaft 55 is imparted to a pinion 68 which meshes with a gear 69 connected through a yielding clutch 70 illustrated in detail in Fig. 12 to drive the shaft 30 on which the indicator pointers 23 are mounted.

The ratchet driving connection 67 adds the computing result of the driving action of the auxiliary drive obtained through the action of the cams 53 in a manner to be hereinafter described, to the computing result of the driving action afforded by the main driving connection which is through the group of gears and the idler 62.

Referring to Figs. 7, 8, 9, 11, and 13: The ratchet connection includes a flanged disk or cup 71 fixed on the gear shaft 55 to form a driving member, and a driven member provided by a ratchet wheel 72 secured to a shaft 73 on the outer end of which the pinion 68 is cut. The inner end of the shaft 73 is bored as at 74 to be journaled on the end 75 of the shaft 55. This end of the shaft 55 is drilled to form a spring pocket 76 in which the compressible spring 77 is received, the outer end thereof bearing against the bottom of the bore 74 and yieldably urging the stub shaft 73 and consequently the ratchet wheel 72 outwardly of the flanged disk or cup 71. The thickness of the ratchet wheel 72 is less than the depth of the flange of the cup so that a limited degree of axial movement is permitted the ratchet wheel without necessitating projection of the wheel beyond the outer edge of the flange.

Figures 7, 8, 9:
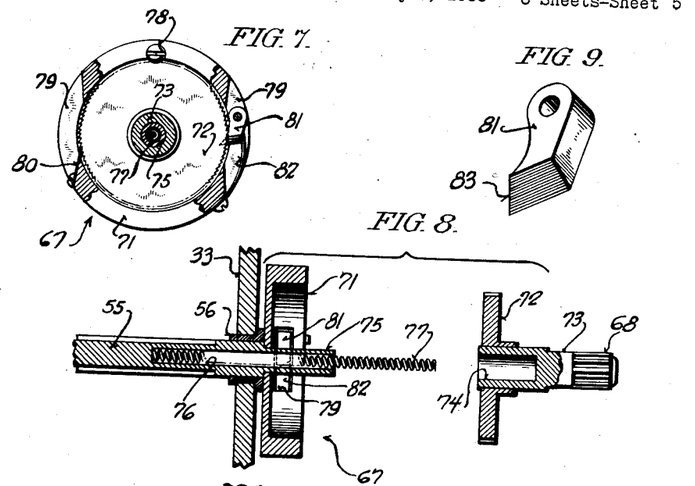
Fig. 7 is a partly sectional elevation showing the connection between the main and auxiliary driving means, for the computing mechanisms, taken on the line 7—7 in Fig. 2.
Fig. 8 is a vertical longitudinal sectional view of the structure shown in Fig. 7, the parts being separated.
Fig. 9 is a perspective view of the pawl, which forms part of the connection shown in Figs. 7 and 8.

After being assembled with the cup 71, the head of a screw 78 threaded in the flange of the cup and overlying the ratchet wheel, as shown in Fig. 7, prevents separation of these elements under action of the spring 77.

As shown in Figs. 7 and 8: At diametrically opposite portions the flange of the cup is slotted as at 79. In one of these slots 79 is a spring pawl 80 rigidly mounted at its outer end and adapted to engage the teeth of the ratchet wheel 72 to provide a uni-directional driving connection between the cup and the ratchet wheel, the position of the spring pawl being such that the ratchet wheel and consequently the pinion 68 are driven in the proper direction by rotation of the shaft 55 through the idler 62. It is to be noted that the spring pawl is wide enough to maintain engagement with the ratchet wheel regardless of the axial shifting of the ratchet wheel in the cup.

In the opposite slot 79 is a second pawl 81 pivotally mounted and spring pressed by a flat leaf spring 82 into engagement with the teeth of the ratchet wheel. The free end of the pawl is formed with an inclined edge 83, as shown in Fig. 9, which engages the teeth of the ratchet wheel. The angle of this inclined edge and the location of the pawl with respect to the possible endwise or axial movement of the ratchet wheel 72 is such that upon inward shifting of the ratchet wheel, the action of the inclined edge advances the ratchet wheel the distance of one tooth. It is thus through an endwise shifting of the ratchet wheel 72 that the supplemental driving action and auxiliary computation is effected.

It is to be noted that the location of the pawl 81 with respect to the range of possible endwise movement of the ratchet wheel 72 is such that at no time will the ratchet wheel be disengaged from the pawl. As the wheel is moved outwardly by the spring 77, the pawl snaps past one tooth and engages the next one so that upon the following inward movement, the ratchet wheel is advanced the distance of one tooth.

So as not to disrupt the driving connection between the pinion 68 and the gear 69, the pinion is of sufficient length to permit its axial reciprocation while in mesh with the gear 69.

The axial reciprocation of the shaft 73 and consequently the ratchet wheel 72, is effected through the operation of the cams 53 in the following manner: Frictionally slidable and journaled for oscillation on one of the studs 50, as shown in Figs. 4 and 6, is a cam follower in the form of a finger 84, the outer end of which is adapted to overlie and ride any one of the series of cams 53. Said finger 84 is manually axially adjustable on its stud 50 to selectively register with any one of said cams 53 and is held in its adjusted position by its frictional engagement with said stud. Said cam follower or finger 84 and the elements of the mechanism with which it cooperates, as described, constitute means for manually adjustably varying the ratio of the auxiliary driving connection between the driving member of the meter 11 which actuates the shaft 40 of the computing mechanism, and the registering indicating mechanism comprising the rotary pointers 23 and the rotary dials 24. Also mounted for oscillation on the same stud 50 but restrained against axial sliding movement thereon, by selective manual engagement in the spaces between said cams 53, as indicated in Figs. 1, 2, and 4, is a lifting finger 85, the outer end of which bears against the short arm of a bell crank lever 86 fulcrumed on the pin 87 between bracket plates 88 carried by the outer support 49. The outer end 89 of the long arm of the bell crank lever bears against the adjacent end of the shaft 73 whereby lifting of the finger 85 moves the shaft 73 inwardly.

As shown in Fig. 6, said cam follower 84 is also mounted to slide axially on the rod 90 which is rigidly connected at its outer end with said lifting finger 85 so that lifting movement imparted to said cam follower 84 by any cam 53 with which said follower is selectively engaged is imparted to said lifting finger 85.

If the cam follower is aligned with the cam at the extreme left of the series, with respect to Figs. 2 and 4, this cam having no depressions or high spots, will impart no movement to the follower.

The next successive cam, however, will impart one lifting action for each complete revolution of the shaft 46. This cam corresponds to one-tenth of a cent and through the advancing of the ratchet wheel affected by its endwise shifting in the manner hereinbefore described, it advances the ratchet wheel one tooth for each complete revolution of the shaft 46. The teeth of the ratchet wheel being one hundred in number correspond to tenths of a cent. The advance of the ratchet wheel and consequently the indicator pointers 23 obtained in this manner augments the drive of the gear 69 and the indicator pointers 23 through the main driving connection. That is to say; the result of the auxiliary computation effected with reference to tenths of one cent by movement of said ratchet wheel 72 is merely added to the result of the main computation based upon whole cents of the price of the liquid dispensed; so that the aggregate value of the two computations is manifested by said pointers 23.

The cams 53, as hereinbefore noted, range in the number of their projections 54 from zero on the left to nine at the right end of the series. To facilitate the adjustment of the cam follower, a scale 91 is provided. This scale may be of any desired design and construction and in the present instance is shown merely as a flat strip of metal secured to the end support 49 and suitably graduated and numerically marked.

The yieldable clutch 70 between the driving gear 69 and the shaft 30, as illustrated in Fig. 12, consists merely of a flat spring 92 disposed in a groove 93 cut into the shaft 30 and bearing against the inner face of the bore in a sleeve hub 94 fixed in the gear 69.

The clutch 70 affords a frictional connection between the gear 69 and the shaft 30 sufficient to drive the indicator pointers 23 and the dials 24 and at the same time yields to permit forced turning of the indicator pointers 23 by means of knobs 95 provided for this purpose. This is necessary as the indicator pointers and the dials 24 must be brought to their zero positions before beginning each dispensing operation.

Said mechanism operates as follows: Assuming that the unit cost per unit of measure of the gasolene to be dispensed is twenty-three and five-tenths cents, the idler gear 62 is meshed with the gear of the group 52 corresponding to the twenty-three cent space on the scale 63, and the cam follower 84 is adjusted to ride the cam having five projections and depressions, as shown in Fig. 4.

Inasmuch as the gear with which the idler 62 meshes has twenty-three teeth, the shaft 55 and the pinion 68 each have ten teeth, and the gear 69 has one hundred teeth, the ratio of the main driving connection between the shaft 46 and the shaft 55 is twenty-three to ten, so that upon each complete revolution of the shaft 46, the shaft 55 will turn two and three-tenths revolutions, causing the gear 69 to turn twenty-three one hundredths of a complete turn.

Simultaneously with this driving action, the pinion 68 will be advanced a distance equal to five teeth on the ratchet wheel 72, which moves the gear 69 and the pointer shaft 30 half the angular distance of one graduation. Hence, the pointers will indicate a cost of twenty-three and one-half cents, or the cost of one gallon of gasolene, the dispensing of one gallon turning the power take-off shaft 18 and consequently the shaft 46, one revolution.

The pointers 23 thus turn quite slowly. This fact is particularly an advantage as it insures greater accuracy where it is desired to dispense only a predetermined amount of gasolene.

It is, of course, understood that access may be had to the mechanism only by those authorized, through a locked door in the casing of the dispensing apparatus, so that the adjustment of the unit cost per unit of measure cannot be tampered with.

However, I do not desire to limit myself to the precise details of construction and arrangement herein set forth as it is obvious that various modifications may be made therein without departing from the essential features of my invention, as defined in the appended claims.

I claim:

1. In combination with a driving member and a driven member, ratchet means forming a driving connection between said members, said ratchet means including a ratchet wheel and a pawl axially movable with respect to each other, means to effect relative axial movement between the ratchet wheel and pawl while retaining the driving engagement therebetween, and means operable upon said relative axial movement of the wheel and pawl to advance the driven member with respect to the driving member and thus augment its actuation by the driving member.

2. In combination with a driving member and a driven member, ratchet means forming a driving connection between said members, said ratchet means including a ratchet wheel and a pawl axially movable with respect to each other, means to effect relative axial movement between the ratchet wheel and pawl while retaining the driving engagement therebetween, and a member having an inclined portion engageable with the teeth of the ratchet wheel and operable upon said relative axial movement of the wheel and pawl to advance the driven member with respect to the driving member and thus augment its actuation by the driving member.

3. In combination with driving and driven members, means forming a driving connection between said members comprising, a ratchet wheel rigidly connected to one of said members, means carried by the other of said members to engage the teeth of the ratchet wheel and form a driving connection accommodating endwise motion between said ratchet wheel and said means while at all times maintaining the driving connection afforded thereby, and means operable upon endwise relative movement between said ratchet wheel and said means to advance the ratchet wheel and thus augment the driving action of the driving member.

4. In an apparatus of the character described, a driving member, a driven member, means to drivingly connect said members including a ratchet wheel carried by one of said members and an element carried by the other of said members and engaging the teeth of the ratchet wheel, said members being arranged for relative endwise motion while retaining the driving connection provided by said element engaging the teeth of the ratchet wheel, and a pawl having an inclined edge engaging the teeth of the ratchet wheel, said pawl being arranged so that endwise relative motion between said members also effects endwise shifting between the ratchet wheel and the pawl and said inclined edge of the pawl advancing the ratchet wheel during such relative endwise motion.

5. In an apparatus of the character described, a driving member, a driven member, means to establish a driving connection between said members comprising a ratchet wheel mounted on the driven member, a pawl carrier attached to the driving member, pawl means on said carrier engageable with the teeth of the ratchet wheel, said members being adapted for endwise relative motion while retaining the driving engagement of said pawl means with the teeth of the ratchet wheel, means to periodically effect endwise motion between said members, and a member on said pawl carrier engageable with the teeth of the ratchet wheel to advance the ratchet wheel upon such endwise relative motion of said members.

6. In an apparatus of the character described, a driving shaft, a driven shaft in axial alignment therewith and adapted for relative axial motion with respect thereto, a ratchet wheel on one of said shafts, a pawl carrier on the other of said shafts, pawl means on said carrier engaging the teeth of the ratchet wheel to form a driving connection between said shafts, the engagement of said pawl means with the ratchet wheel accommodating endwise relative motion of said shafts, and a second pawl means on said carrier and engageable with the teeth of the ratchet wheel, said second pawl means having an inclined ratchet wheel engaging edge adapted upon endwise shifting of said shaft to advance the driven shaft and thus augment the driving action of the driving shaft.

7. In apparatus of the character described, a driving shaft, a driven shaft in axial alignment therewith, a ratchet wheel on the driven shaft, a cup on the driving shaft to receive the ratchet wheel, the driven shaft with the ratchet wheel thereon being shiftable endwise with respect to the driving shaft and the cup, means to yieldably urge the driven shaft and the ratchet wheel away from the driving shaft and cup, pawl means carried by the cup and engaging the teeth of the ratchet wheel to establish a driving connection between said shafts which connection is maintained during endwise relative motion, a second pawl means carried by the cup and engaging the teeth of the ratchet wheel, said second pawl means having an inclined tooth engaging portion adapted upon endwise relative motion of the ratchet wheel to advance the ratchet wheel and the driven member and thus augment the driving connection of the first pawl means with the ratchet wheel, and means to periodically move the driven member and the ratchet wheel toward the driving shaft and cup against the action of said spring means.

8. An apparatus of the character described, comprising a driving shaft, a driven shaft in axial alignment with the driving shaft and freely rotatable and endwise shiftable with respect to the driving shaft, one of said shafts having its end piloted in a bore in the other shaft, spring means between the shafts to yieldably urge the same apart, a ratchet wheel fixed to the driven shaft, a housing member fixed to the driving shaft and arranged to receive the ratchet wheel, said housing being of greater depth than the width of the ratchet wheel so that the driven shaft with the ratchet wheel has a degree of relative axial shifting movement with respect to the housing without necessitating removal of the ratchet wheel from the housing, pawl means carried by the housing and engaging the teeth of the ratchet wheel to provide a driving connection between said shafts which connection is maintained regardless of endwise relative motion between the shafts, and a second pawl means carried by the housing and having an inclined edge engaging the teeth of the ratchet wheel during endwise relative motion of said shafts, and means to periodically push the driven shaft toward the driving shaft against the action of said spring means to effect such relative endwise motion.

9. In an apparatus of the character described, a drive shaft, a member to be driven from said shaft, a bank of progressively larger gears fixed to said drive shaft, a plurality of different cams fixed to said drive shaft, gear means selectively engageable with one of the gears of said bank to provide a driving connection between said drive shaft and the member to be driven, and means operable by a selected cam to supplement the driving action of said gear means.

10. In apparatus of the character described, a rotatable drive shaft, a shaft to be driven from the drive shaft, an intermediate shaft, a bank of different diameter gears on the drive shaft, a series of cams having progressively increasing numbers of high and low points also mounted on the drive shaft, gear means at all times drivingly connected with the intermediate shaft and selectively engageable with any gear of said bank of gears to establish a driving connection between the drive shaft and the intermediate shaft, a clutch connection between the intermediate shaft and the shaft to be driven, whereby the shaft to be driven is actuated from the intermediate shaft and whereby the shaft to be driven is free to advance ahead of the intermediate shaft, and means operable by a selected cam to advance the shaft to be driven ahead of the intermediate shaft without disturbing the driving action of the intermediate shaft.

11. In apparatus of the character described, a drive shaft, a shaft to be driven, an intermediate shaft substantially in axial alignment with the shaft to be driven, said shaft to be driven and the intermediate shaft being adapted for endwise relative motion, a ratchet driving connection between the intermediate shaft and the shaft to be driven including means operable upon relative endwise motion of said shafts to advance the shaft to be driven with respect to the intermediate shaft, a series of different diameter gears carried by the drive shaft, a series of cams having progressively increasing numbers of high and low spots also carried by said drive shaft, gear means at all times in driving connection with the intermediate shaft and selectively engageable with any gear of said series to afford a driving connection between the drive shaft and the intermediate shaft, and means operable by any selected cam to periodically effect relative endwise motion between the shaft to be driven and the intermediate shaft and thereby advance the shaft to be driven without disturbing the driving action afforded by the gear means.

12. In a mechanical movement embodying compound variable drive mechanisms; a ratchet wheel; and means for imparting to said ratchet wheel axial movement and consequent rotary movement, and other means for imparting rotary movement to said wheel independently of such axial movement, including a rotary pawl carrier, in coaxial relation with said ratchet wheel, and an advancing pawl on said carrier for engaging the teeth of said ratchet, whereby the axis of said pawl is carried in a circular path concentric with the axis of said ratchet wheel; and means for preventing accidental rotary displacement of said ratchet wheel, including a keeper pawl for engaging the teeth of said ratchet.

CARL K. SCHWARTZ.